US008922087B1

(12) United States Patent
Rittenhouse

(10) Patent No.: US 8,922,087 B1
(45) Date of Patent: Dec. 30, 2014

(54) HIGH EFFICIENCY LOW TORQUE RIPPLE MULTI-PHASE PERMANENT MAGNET MACHINE

(71) Applicant: Norman P Rittenhouse, Fairbury, IL (US)

(72) Inventor: Norman P Rittenhouse, Fairbury, IL (US)

( * ) Notice: Subject to any disclaimer, the term of this patent is extended or adjusted under 35 U.S.C. 154(b) by 0 days.

(21) Appl. No.: 14/010,046

(22) Filed: Aug. 26, 2013

(51) Int. Cl.
| | |
|---|---|
| H02K 21/00 | (2006.01) |
| H02K 21/12 | (2006.01) |
| H02K 21/22 | (2006.01) |
| H02K 1/14 | (2006.01) |
| H02K 1/27 | (2006.01) |
| H02K 11/00 | (2006.01) |
| H02K 9/08 | (2006.01) |
| H02K 9/20 | (2006.01) |

(52) U.S. Cl.
CPC ............... H02K 1/148 (2013.01); H02K 1/146 (2013.01); H02K 1/278 (2013.01); H02K 1/2786 (2013.01); H02K 11/0021 (2013.01); H02K 11/0073 (2013.01); H02K 9/08 (2013.01); H02K 9/20 (2013.01)
USPC .... 310/185; 310/156.01; 310/184; 310/68 D; 310/67 R; 310/112

(58) Field of Classification Search
USPC ............ 310/112, 153, 156.01, 178, 180, 184, 310/185, 67 R, 68 D, 68 C, 75 D
See application file for complete search history.

(56) References Cited

U.S. PATENT DOCUMENTS

| | | | | |
|---|---|---|---|---|
| 2,374,240 | A | | 4/1945 | Shankman |
| 3,344,325 | A | * | 9/1967 | Sklaroff ......................... 318/696 |
| 3,374,005 | A | | 3/1968 | Donlon |
| 3,409,309 | A | | 11/1968 | Larsen |
| 3,665,227 | A | | 5/1972 | Busch |
| 3,978,356 | A | * | 8/1976 | Spiesberger ............. 310/156.42 |
| 3,991,843 | A | | 11/1976 | Davidson |
| 4,122,907 | A | | 10/1978 | Davidson |
| 4,168,758 | A | | 9/1979 | Holt |
| 4,190,779 | A | * | 2/1980 | Schaeffer .................... 310/12.17 |
| 4,458,184 | A | * | 7/1984 | Kawate .................... 318/400.41 |
| 4,513,833 | A | | 4/1985 | Sheldon |
| 4,625,392 | A | | 12/1986 | Stokes |
| 4,671,369 | A | | 6/1987 | Tiffin |
| 4,754,207 | A | * | 6/1988 | Heidelberg et al. ...... 318/400.41 |
| 4,853,567 | A | | 8/1989 | Muramatsu |
| 4,874,052 | A | | 10/1989 | Purcell |

(Continued)

FOREIGN PATENT DOCUMENTS

JP          63-77363       *  4/1988  ............. H02K 21/22

Primary Examiner — Burton Mullins
(74) Attorney, Agent, or Firm — Brian S. Steinberger; Phyllis K. Wood; Law Offices of Brian S. Steinberger, P.A.

(57) ABSTRACT

An electrically driven motor, an electrical generator, a rotating electrical machine and method of operating, that includes a rotating rotor having an even number of alternating polarity permanent magnet poles and a stator with an odd number of evenly spaced alternating magnetic polarity electromagnetic poles divided into an odd number of equal stator phase groups with a magnetically unbalanced orphan, pole from each stator phase group removed without re-spacing the remaining stator poles to produce a gap between stator phase groups that is greater than the spacing between adjacent poles in each stator phase group. The rotor can be a rotating external rotor or a stationary internal rotor and the stator can be a stationary interior stator or a rotating exterior stator.

33 Claims, 20 Drawing Sheets

(56) References Cited

U.S. PATENT DOCUMENTS

| | | | |
|---|---|---|---|
| 4,893,687 A | 1/1990 | Simmons | |
| 5,226,501 A | 7/1993 | Takata | |
| 5,361,011 A | 11/1994 | York | |
| 5,370,200 A | 12/1994 | Takata | |
| 5,382,853 A * | 1/1995 | von der Heide et al. | 310/67 R |
| 5,469,005 A * | 11/1995 | Asama et al. | 310/68 B |
| 5,483,113 A | 1/1996 | Sakuragi | |
| 5,533,587 A | 7/1996 | Dow | |
| 5,647,721 A | 7/1997 | Rohrbaugh | |
| 5,777,413 A | 7/1998 | Nagata | |
| 5,834,865 A | 11/1998 | Sugiura | |
| 5,861,695 A | 1/1999 | Brassard | |
| 6,044,921 A | 4/2000 | Lansberry | |
| 6,094,011 A * | 7/2000 | Notsu | 315/78 |
| 6,153,953 A | 11/2000 | Isozaki | |
| 6,220,377 B1 | 4/2001 | Lansberry | |
| 6,259,176 B1 | 7/2001 | Isozaki | |
| 6,327,167 B1 | 12/2001 | Morgan | |
| 6,384,496 B1 * | 5/2002 | Pyntikov et al. | 310/68 B |
| 6,435,292 B2 | 8/2002 | Lemke | |
| 6,492,756 B1 * | 12/2002 | Maslov et al. | 310/156.12 |
| 6,814,172 B1 | 11/2004 | Vu | |
| 6,860,571 B2 | 3/2005 | Scheetz | |
| 6,975,054 B2 * | 12/2005 | Shkondin | 310/148 |
| 7,038,348 B2 * | 5/2006 | Takase et al. | 310/216.008 |
| 7,108,097 B1 | 9/2006 | Bolton | |
| 7,273,117 B2 | 9/2007 | Pond | |
| 7,343,991 B2 * | 3/2008 | Rittenhouse | 180/9.5 |
| 7,492,074 B1 | 2/2009 | Rittenhouse | |
| 7,579,742 B1 | 8/2009 | Rittenhouse | |
| 7,723,891 B2 * | 5/2010 | Rittenhouse | 310/216.023 |
| 7,868,510 B2 | 1/2011 | Rittenhouse | |
| 2001/0001993 A1 | 5/2001 | Lemke | |
| 2003/0047369 A1 | 3/2003 | Katagiri | |
| 2003/0074985 A1 | 4/2003 | Liao | |
| 2003/0116364 A1 | 6/2003 | Simmons | |
| 2003/0116366 A1 | 6/2003 | Simmons | |
| 2003/0127258 A1 | 7/2003 | Lansberry | |
| 2003/0193263 A1 | 10/2003 | Maslov | |
| 2004/0119345 A1 | 6/2004 | Takano | |
| 2004/0168837 A1 | 9/2004 | Michaud | |
| 2004/0195023 A1 | 10/2004 | Yoshihara | |
| 2006/0208601 A1 | 9/2006 | Enomoto | |
| 2006/0208602 A1 | 9/2006 | Enomoto | |
| 2007/0222170 A1 | 9/2007 | Sasnowski | |
| 2007/0227796 A1 | 10/2007 | Simmons | |
| 2007/0252452 A1 | 11/2007 | Ishimoto | |
| 2008/0018196 A1 | 1/2008 | Enomoto | |
| 2009/0134734 A1 * | 5/2009 | Nashiki | 310/162 |
| 2009/0322165 A1 | 12/2009 | Rittenhouse | |
| 2012/0242184 A1 * | 9/2012 | Hu | 310/208 |

* cited by examiner

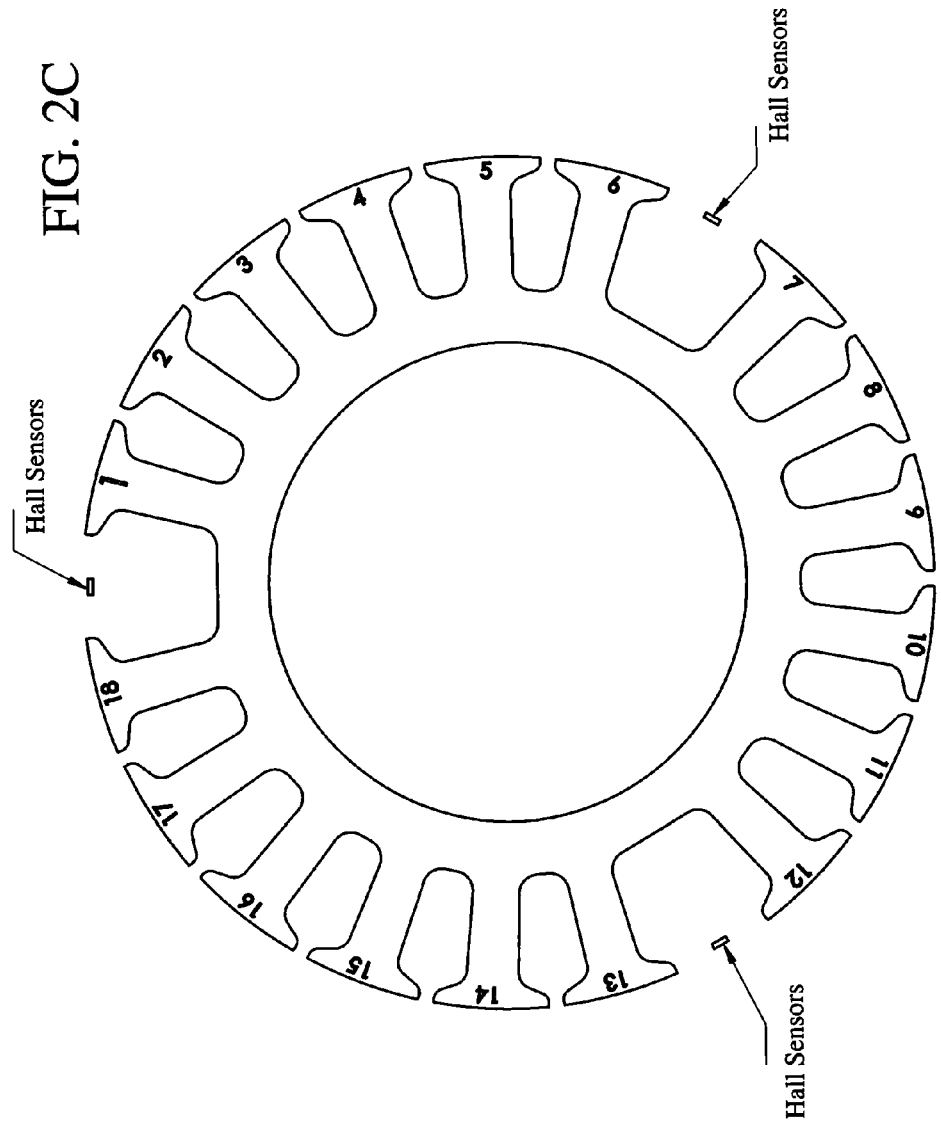

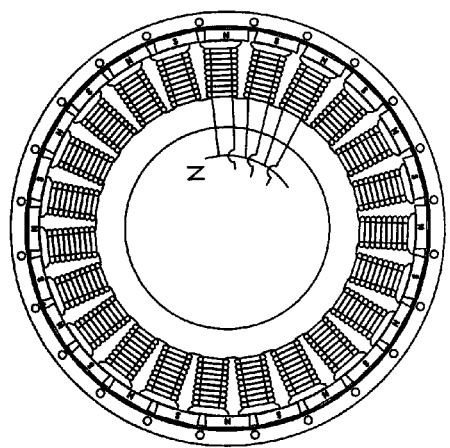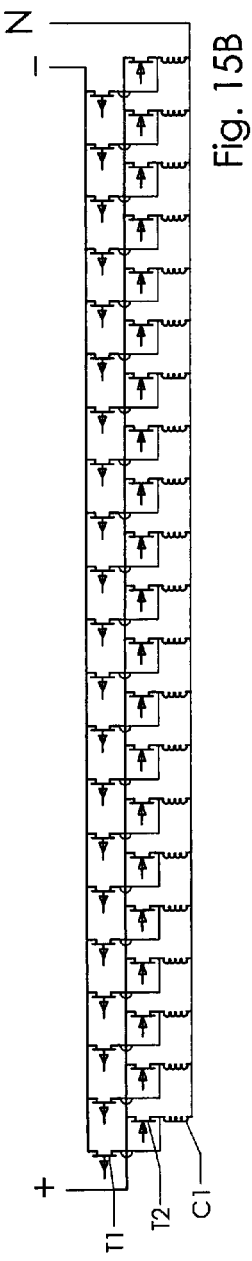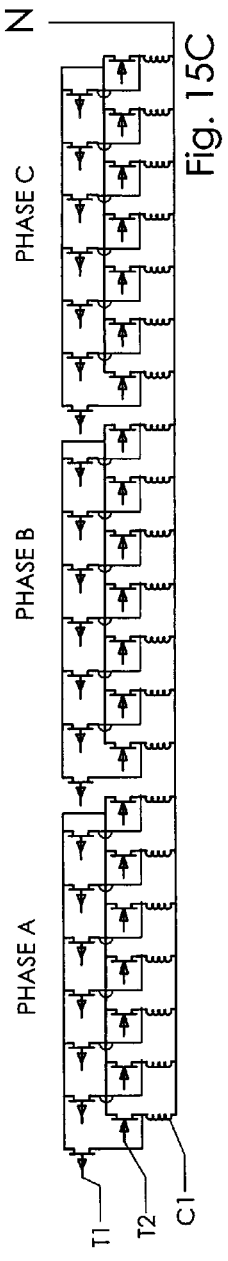

HIGH EFFICIENCY LOW TORQUE RIPPLE MULTI-PHASE PERMANENT MAGNET MACHINE

FIELD OF THE INVENTION

This invention relates to motors and generators and, in particular, to methods, systems and devices and machines for a high efficiency low torque ripple multi-phase permanent magnet motor and/or generator having a rotor-stator structure.

BACKGROUND AND PRIOR ART

Most multi-phase motor designs are derived from those originated by Nicola Tesla, and are sometimes described as "squirrel cage" or "rotating field" motors. While these motors are cheap to build, they suffer from low efficiency, armature effect, and excessive heating.

Earlier conversions of squirrel cage motors to permanent magnet merely replaced the rotor iron laminations with permanent magnets. While this configuration had higher efficiency, it then displayed strong "torque cogging" tendencies, and was still subject to the efficiency robbing "armature effect"

Other inventors pursued "fractional slot" configurations of the original "squirrel cage" design, which lowered torque ripple, but at a loss of overall efficiency. Some of their "fractional" stators slots actually rob power and may be considered parasitic "drones", because they oppose the direction of rotation. This is because all magnetic poles must be considered as balanced in having a north and a south pole, therefore having an even number of poles. Any single pole must, by definition have its opposite pole somewhere else, and in a "fractional" motor this is balanced to an unwanted location.

Patents related to electric motors and generators issued to the inventor of the subject application include U.S. Pat. No. 8,253,299 issued on Aug. 28, 2012; U.S. Pat. No. 8,183,726 issued May 22, 1012; U.S. Pat. No. 7,868,510 issued on Jan. 11, 2011; U.S. Pat. No. 7,798,261 issued on Sep. 21, 2010; U.S. Pat. No. 7,723,891 issued on May 25, 2010; U.S. Pat. No. 7,640,648 issued on Jan. 5, 2010; U.S. Pat. No. 7,579,742 issued on Aug. 25, 2009; U.S. Pat. No. 7,492,074 issued on Feb. 17, 2009 and U.S. Pat. No. 7,343,991 issued on Mar. 18, 2008. These patented technologies use a unique, three stator configuration which frees the design from the efficiency robbing "armature effect", and achieves much higher overall electrical conversion efficiency. Some "torque ripple", however, remains.

What is needed to solve the problems associated with prior art "squirrel cage" or "rotating field" motors is a high efficiency low torque ripple multi-phase permanent magnet machine with a new, unique stator configuration that essentially eliminates torque ripple, has improved efficiency, and enhanced smoothness.

SUMMARY OF THE INVENTION

A primary objective of the present invention is to provide methods, systems and devices for a high efficiency low torque ripple multi-phase permanent magnet machine with a new, unique stator configuration, torque ripple is all but eliminated, efficiency is improved still further, and smoothness is enhanced.

A secondary objective of the present invention is to provide methods, systems and devices for a high efficiency low torque ripple multi-phase permanent magnet motor and generator with single and multi stator configurations that work well. The unique single and multi stator configurations of "fail safe" motors have been built and tested.

A third objective of the present invention is to provide methods, systems and devices for a Motor/Generator which has a rotating rotor including an even number of alternating polarity permanent magnet poles, and a stator which has evenly spaced alternating magnetic polarity electromagnetic poles spaced as though for an odd number, in which the magnetically unbalanced, or orphan, pole positions are removed without re-spacing the remaining stator poles, for an exterior rotor or interior rotor configuration.

A fourth objective of the present invention is to provide methods, systems and devices for a motor/generator which has a rotating rotor including an even number of alternating polarity permanent magnet poles, and multiple stators each having evenly spaced alternating magnetic polarity electromagnetic poles spaced as though for an odd number, in which the magnetically unbalanced, or orphan, pole positions are removed without re-spacing the remaining stator poles, for an exterior rotor or interior rotor configuration.

A fifth objective of the present invention is to provide methods, systems and devices for a motor/generator that has multiple stators with multiple segments of stator poles on each stator, each stator pole having coil windings that are wired in series or parallel with electrically offset stator positions to create a multiple phase machine, where the similarly phased stator pole groups in each stator are electrically interconnected.

A sixth objective of the present invention is to provide methods, systems and devices for a motor/generator having an even number of evenly spaced alternating polarity permanent magnet rotor poles, one or more stators each having an odd number of evenly spaced stator electromagnetic poles, with exterior drum rotor or interior drum rotor.

An embodiment provides a rotor-stator structure that includes a rotor having an even number of evenly spaced alternating polarity permanent magnet rotor poles; and one or more stators each having an odd number of evenly spaced stator electromagnetic poles. The can be an exterior drum rotor or can be an interior drum rotor. Each stator pole can be individually driven by a switching electronics for synchronous rectification of ripple free direct current or torque ripple free power output.

The rotor-stator structure wherein the rotor and stator includes an even number of permanent magnets in the rotor and an odd number of wound stator poles in the stator with one coil terminal per wound pole coil winding connected to a common electrical neutral, and the other coil terminal of each stator coil per wound pole coil winding is connected to two semiconductor switches capable of variable synchronous rectification when acting as a generator and variable synchronous brushless commutation when acting as a motor.

The rotor-stator structure wherein the rotor and stator includes an even number of permanent magnets in the rotor and an odd number of poles in the stator, in which the one coil terminal of each of the stator coil windings is connected to a common electrical neutral, and the other coil terminal of each stator coil winding is connected to two semiconductor diodes or electronic switches capable of variable synchronous rectification to generate nearly ripple free positive and negative Direct Current Output without the need for filtering, while presenting the driving engine with a negligible amount of torque ripple.

The rotor-stator structure as a generator including an even number of permanent magnet moving poles in the rotor, an odd number of wound stator poles, in which an AC output of each individually wound pole is rectified and the timing of the synchronous switch can be varied to gave a variable and ripple free Direct Current output.

The rotor-stator structure as a generator that includes an even number of permanent magnet poles, and an odd number of stator poles, in which each stator coil is individually wound and the AC output of each is rectified by a semiconductor switch of either a diode or a semiconductor switch, allowing synchronous rectification to a DC bus.

The rotor-stator structure can be a generator that includes a rotor with an even number of alternating polarity permanent magnet poles, a stator with an odd number of stator poles, in which each stator pole coil is individually wound and one terminal of each coil is connected with a common neutral, the other terminal of each coil is connected to complimentary properly timed semiconductor switches, which are grouped in three groups, the output of each group producing one phase of variable frequency and variable voltage three phase alternating current with neutral.

The rotor-stator structure can be a generator that includes a rotor with an even number of alternating polarity permanent magnet poles, a stator with an odd number of stator poles, in which each stator pole coil is individually wound and the two terminals of each coil are connected to complimentary properly timed semiconductor switches each in a bridge configuration, which are grouped in three groups, the output of each group producing one phase of variable frequency and variable voltage three phase alternating current.

The rotor-stator structure of can be powered as a variable speed alternating current motor that includes a rotor with an even number of alternating polarity permanent magnet poles, a stator with an odd number of poles, in which each stator pole coil is individually wound and one terminal of each coil is connected to a common neutral, and the other terminal of each coil is connected to a complimentary, timed semiconductor switch of three groups, each group being supplied with one phase of alternating current via an AC buss, to allow the machine to operate as a variable speed AC motor, providing seamless power, free of torque ripple.

The rotor-stator structure can be powered as a variable speed alternating current motor that includes a rotor with an even number al alternating polarity permanent magnet poles, a stator with an odd number of poles, in which each stator pole coil is individually wound with the coils terminals connected to complimentary, timed semiconductor switches in a bridge configuration, with the individual bridges arranged three groups, each group being supplied with one phase of alternating current via an AC buss, to allow the machine to operate as a variable speed AC motor, providing seamless power, free of torque ripple.

Further objects and advantages of this invention will be apparent from the following detailed description of preferred embodiments which are illustrated schematically in the accompanying drawings.

BRIEF DESCRIPTION OF THE FIGURES

FIG. 2C shows multiple hall sensors, or an array of hall sensor installed where the orphan poles were removed.

FIG. 15A shows a permanent magnet rotor with an even number of poles, a stator with an odd number of evenly spaced poles with one terminal of each separate stator coil winding connected to a common neutral bus.

FIG. 15B is a schematic showing the connections between the stator coils (C1 . . . ), the semiconductor switches (T1 . . . ) and the three electrical busses (+, −, N).

FIG. 15C is a schematic showing the connections between the stator coils (C1 . . . ), the complimentary switching semiconductors (T1, T2 . . . ) which are arranged and timed to output three phases of variable frequency and variable voltage alternating current, when used as an AC generator. When used as a motor, the incoming three phases of alternating current, properly timed and switched by the complimentary semiconductor switches, allow the machine to be operated as a variable speed AC motor.

DESCRIPTION OF THE PREFERRED EMBODIMENTS

Figure 1A:
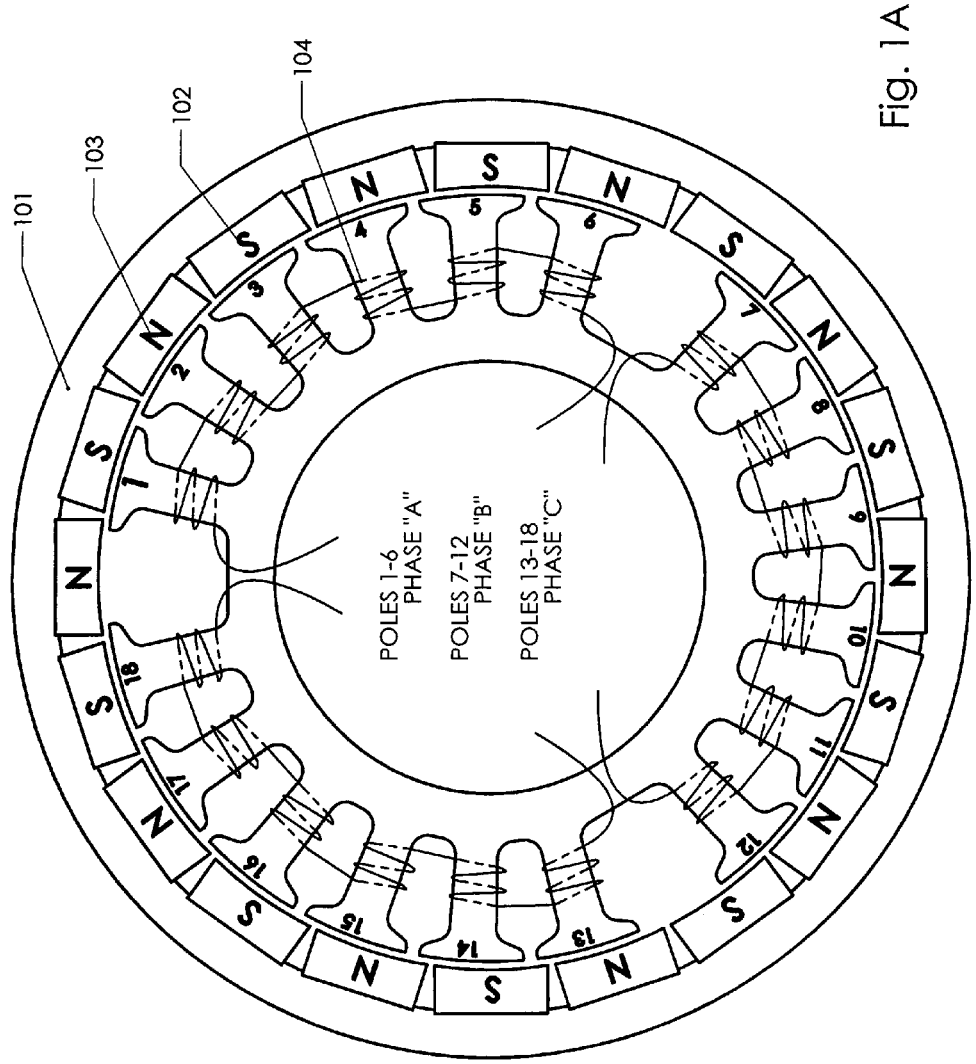
FIG. 1A shows a single stator which would have 21 evenly spaced pole positions, with every seventh pole removed, enclosed by the twenty permanent magnets of the rotor drum.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
101 rotating rotor magnet drum
102 South Pole Permanent Magnet
103 North Pole Permanent Magnet
104 stator phase winding
106 hub
200 bicycle wheel
201 tire
202 axel
204 bearing
206 non-rotating hub
300 propeller
302 axel
304 bearing
306 non-rotating hub
810A stator poles phase A
810B stator poles phase B
810C stator poles phase C
820 non-metallic hub
830A conductors
830B conductors
830C conductors
901 rotor drum
904 stator As referenced above, the inventor has patented various types of electric motors and generators that include U.S. Pat. No. 8,253,299 issued on Aug. 28, 2012; U.S. Pat. No. 8,183,726 issued May 22, 1012; U.S. Pat. No. 7,868,510 issued on Jan. 11, 2011; U.S. Pat. No. 7,798,261 issued on Sep. 21, 2010; U.S. Pat. No. 7,723,891 issued on May 25, 2010; U.S. Pat. No. 7,640,648 issued on Jan. 5, 2010; U.S. Pat. No. 7,579,742 issued on Aug. 25, 2009; U.S. Pat. No. 7,492,074 issued on Feb. 17, 2009 and U.S. Pat. No. 7,343,991 issued on Mar. 18, 2008, all of which are incorporated by reference in their entirety.

The present invention provides methods, systems and devices for a high efficiency low torque ripple multi-phase permanent magnet motors and generators. The unique arrangement of rotor poles and stator poles results in higher efficiency, lower acoustical noise, and torque ripple an order of magnitude lower than conventional permanent magnet motors or generators. Additionally, the torque and power density can be double conventional motors/generators generally available.

On cursory examination, the motor/generator of the present invention has some physical similarities to a "rotating field" "squirrel cage" machine, but its magnetic field does not rotate. Furthermore, on initial examination, this motor/generator of the present invention has some superficial similarity to "fractional slot" motors, but is not fractional slot in any way. There are no unbalanced poles, nor are any poles sharing windings of different phases of electrical power.

The high efficiency low torque ripple multi-phase permanent magnet motor and generator of the present invention is not a "fractional slot", contains no "drone", "orphan" or magnetically incomplete poles, and is not necessarily on one rotational plane.

The present invention combines the inventor's previous multi-stator design and a new, unique stator configuration, where torque ripple is all but eliminated, efficiency is improved still further, and smoothness is enhanced. Single and multi stator configurations work well, and with unique configurations of "fail safe" motors which have been built and tested.

Figure 2A:
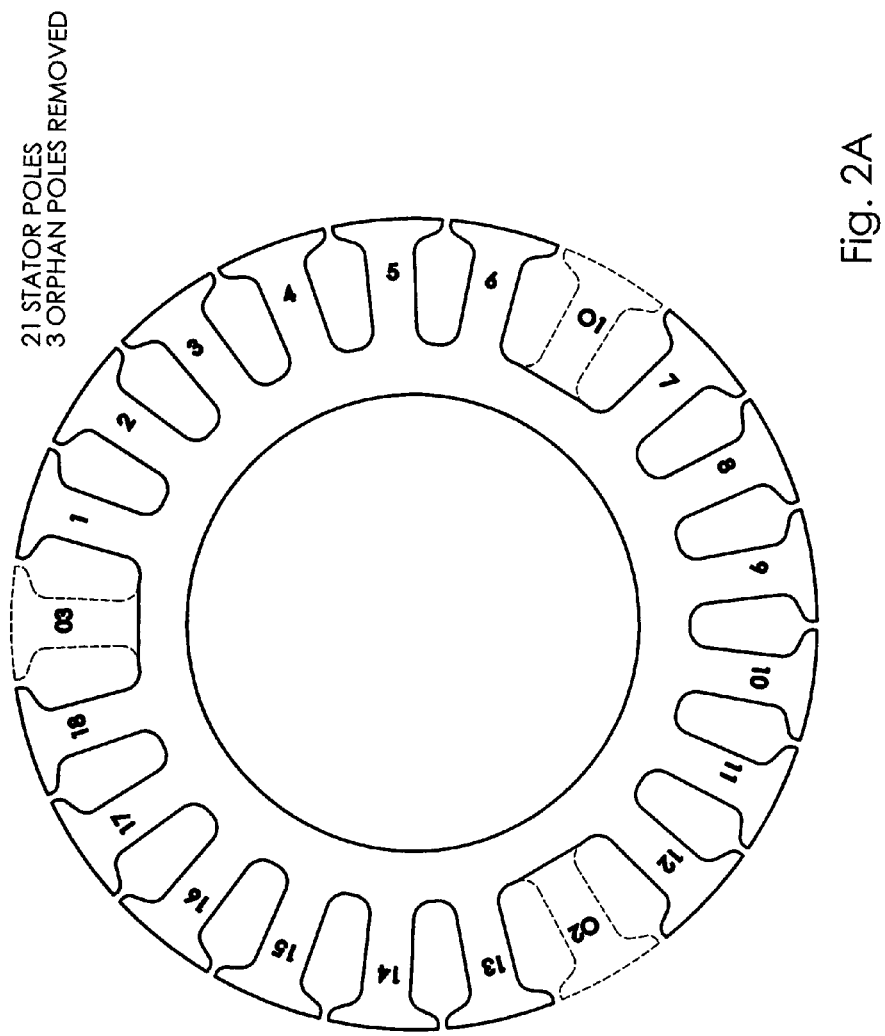
FIG. 2A shows a single stator, with equal pole spacing for 21 poles, and with three orphan poles removed with the permanent magnet rotor.

The methods, systems and apparatus of the present invention provide a motor/generator that has a rotating rotor with an even number of alternating polarity permanent magnet poles and a stator with evenly spaced alternating magnetic polarity electromagnetic poles spaced as though for an odd number as shown in FIG. 2A, in which the magnetically unbalanced, or orphan, pole positions (dashed lines) are removed without re-spacing the remaining stator poles, for an exterior rotor or interior rotor configuration.

FIG. 1A shows a single stator which would have 21 evenly spaced pole positions, with every seventh pole removed, enclosed by the twenty permanent magnets of the rotor drum. As shown, Stator poles 1-6 and their windings comprise phase "A"; stator poles 7-12 and their windings comprise phase "B"; and stator poles 13-18 and their windings comprise phase "C".

Figure 1B:
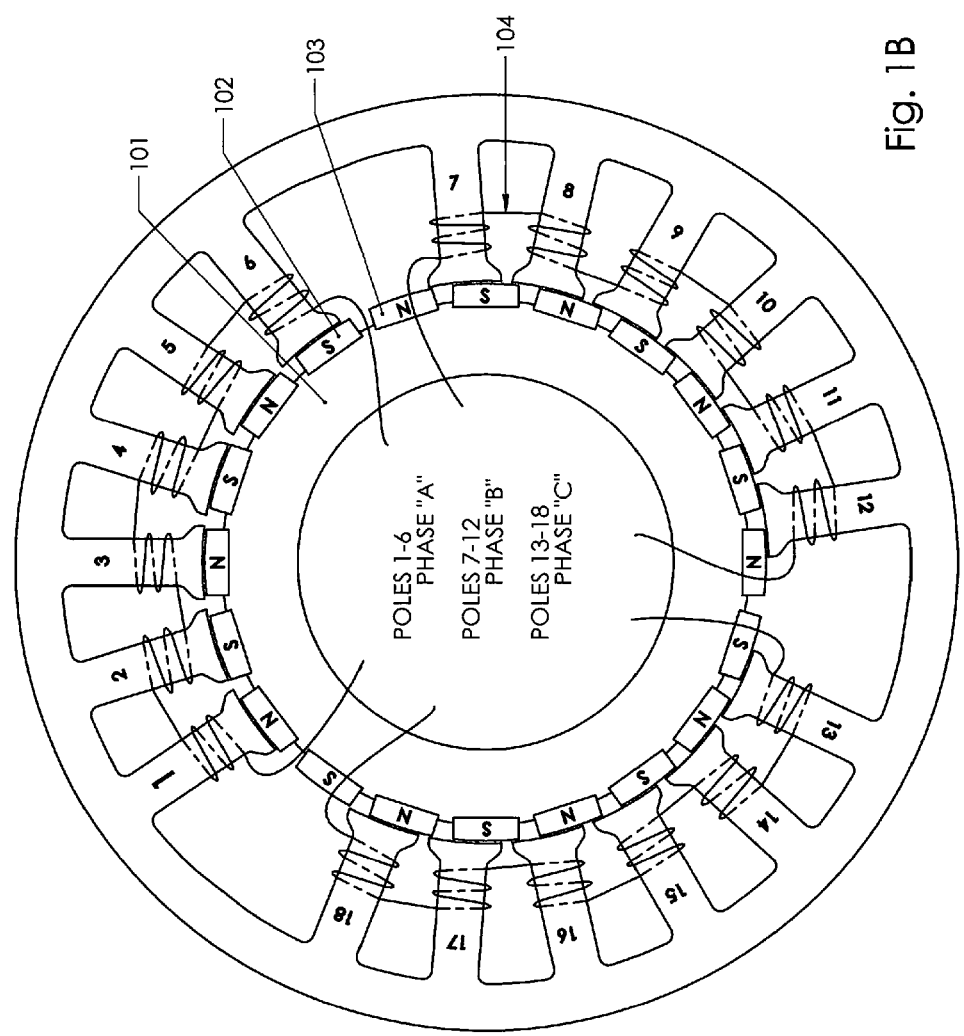
FIG. 1B shows a single stator which would have twenty-one evenly spaced pole positions, with every seventh pole removed, surrounding an internal rotor with twenty permanent magnets in the internal rotor drum.

FIG. 1B shows a single stator which would have 21 evenly spaced pole positions, with every seventh pole removed, surrounding an internal rotor with 20 permanent magnets in the internal rotor drum. The stator pole number and rotor pole numbers are calculated from the formulae:

For three phase machines: $(3Y+1)=X$, or $(3Y-1)=X$

Where $(Y-1)$=number of remaining active electromagnetic poles per phase group,
X=number of permanent magnetic poles in the rotor, and
Y=number of electromagnetic pole spaces in each stator phase group. For three phase machines, Y=3, 5, 7, 9, 11, 13 and so on.

For five phase machines: $(5Y+1)=X$, or $(5Y-1)=X$

Where $(Y-1)$=number of remaining active electromagnetic poles per phase group. For five phase machines, Y=3, 5, 7, 9, and so on.

As shown in FIG. 1B, each stator phase group has seven electromagnetic pole spaces (Y=7) in each stator phase group with one pole, referred to as an 'orphan pole', from each phase group removed leaving six poles per phase (Y−1=6). In the configuration shown, the rotor includes twenty permanent magnetic poles (X=20).

FIG. 2A shows a single stator, with equal pole spacing for 21 poles, and with three orphan poles removed. The three orphan poles are illustrated with dashed lines are identified as 01, 02 and 03 in FIG. 2A. As shown, poles 1-6 comprise Phase "A", poles 7-12 comprise Phase "B", and poles 13-18 comprise Phase "C".

For the purpose of illustration and not limitation, the number of permanent magnets in the rotor is twenty poles, the number of equally spaced stator pole positions would be twenty-one, with every seventh phantom pole removed, leaving three groups of six poles each. However, those skilled in the art will understand that other combinations are possible without deviating from the scope of the present invention. For example, the motor/generator with a single stator of the above description surrounding the permanent magnet rotor can include an even number of alternating polarity of permanent magnets. In this example, the motor/generator has a stator with an even number of alternating polarity of permanent magnets.

The six poles are wired alternating between north and south poles such as N-S-N-S-N-S. For the purposes of simplicity, a single stator machine will then have three groupings of six poles each, with each grouping being for a separate electrical phase of a three phase machine. Those skilled in the art will understand that other numbers of phases, such as a five phase machine, are possible without deviating from the scope of the present invention.

The motor/generator has an even number of magnetically complete poles in each pole grouping after the phantom or drone pole positions are removed with each pole grouping wired to receive or generate power for a single phase.

The motor/generator can have the powering and controlling electronics located in and mounted to the spaces vacated by the removal of the unbalanced or orphan poles of the single stator. The Hall sensors which sense position and speed of the rotor permanent magnets are located in a position magnetically undisturbed by the electromagnets of the stator, in the location made available by removal of the orphan or unbalanced stator poles.

Figure 2B:
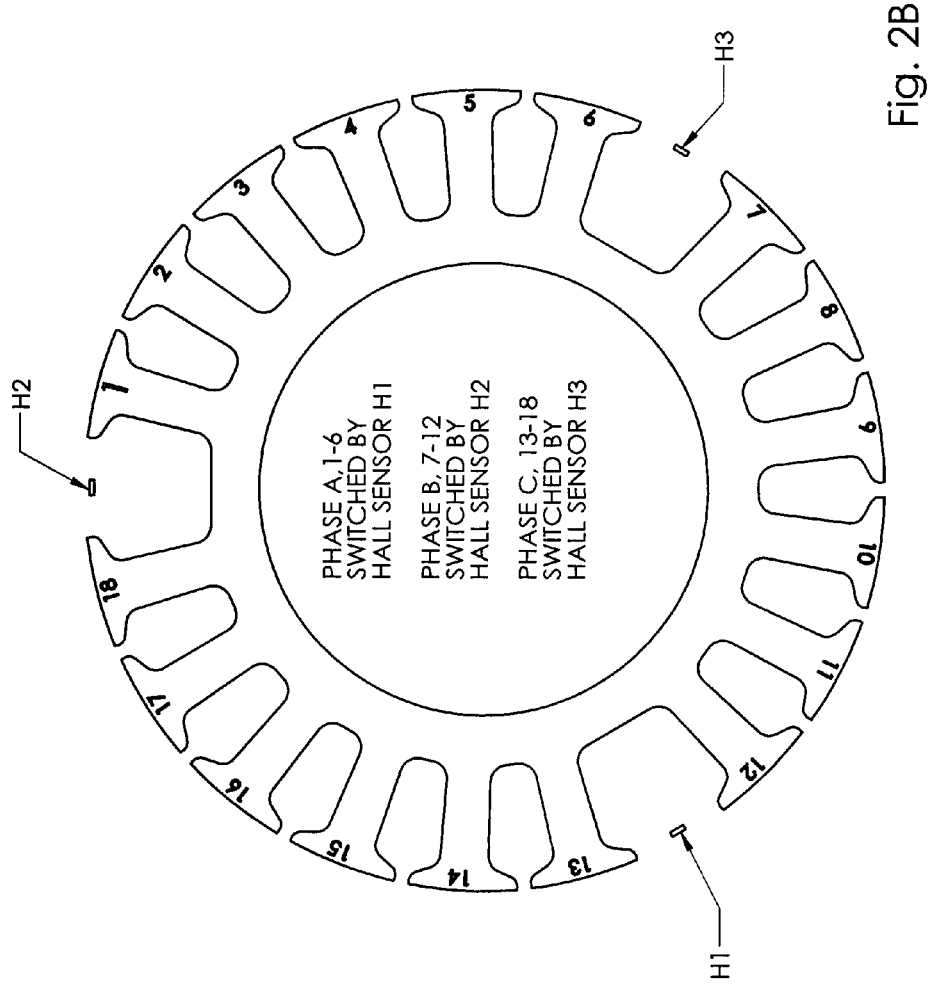
FIG. 2B shows the single stator shown in FIG. 2A with position sensing Hall sensors installed where the removed orphan poles were.

FIG. 2B shows the same single stator as shown in FIG. 2A, in which position sensing hall sensors, labeled as H1, H2 and H3 are installed where the orphan poles were removed. The hall sensors may be either single units or multiple units or an array as shown in FIG. 2C. As shown in FIG. 2B, hall effect sensor H1 switches Phase "A", H2 switches Phase "B", and H3 switches Phase "C". In the configuration shown in FIG. 2B, the motor/generator has each stator phase group powered and controlled by external electronics.

The timing signals are provided by the hall sensors located in the vacated space left by removal of the magnetically unbalanced or orphan stator poles. In this configuration, the Hall sensors are located away from the magnetic interference from the neighboring electromagnetic poles. When the motor/generator has an even number of permanent magnet poles, an odd number of stator poles with the orphan poles removed, the space vacated by the removed orphan poles can be machined flat to allow the mounting of an electronics mounting plate and to allow the stator core surface to act as a heat sink for the electronics mounting plate.

Figure 3A:
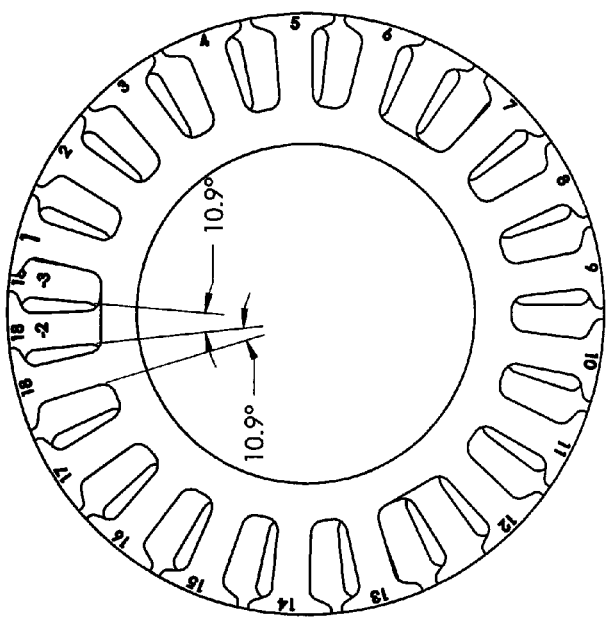
FIG. 3A shows a superimposed drawing of a three stator machine showing the offset angle between the three stators.
Figure 3B:
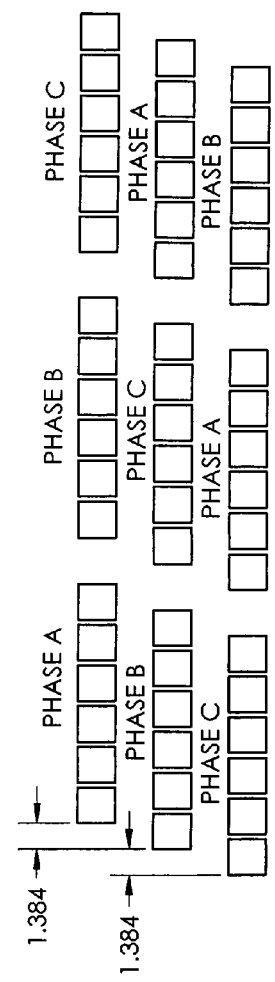
FIG. 3B shows a linear depiction of the same three stators shown in FIG. 3A.

FIG. 3A shows a superimposed drawing showing a three stator machine with an offset angle between the different stators shown as approximately 10.9 degrees. FIG. 3B shows a linear depiction of the same stators, where groups of poles that have the same phase can be interconnected or operated separately. Each stator phase pole group can be fabricated separately and mounted using non-magnetic materials to magnetically isolate each phase pole group from each other phase pole group for greater efficiency.

For a motor having an even number of permanent magnet poles in the rotor and an odd number of poles in the stator in which the orphan poles have been removed, the commutation electronics can be located within the space vacated by the removal of the orphan poles. The electrical windings of the stator poles can have a common neutral terminal and the windings are alternately driven by positive and negative power supplies with a common neutral connected to the windings common neutral.

For a generator having an even number of poles of permanent magnets in the rotor, an odd number of poles in the stator with the orphan poles removed, i the rectification electronics can be located within the space vacated by the removed orphan poles in the stator.

Figure 4A:
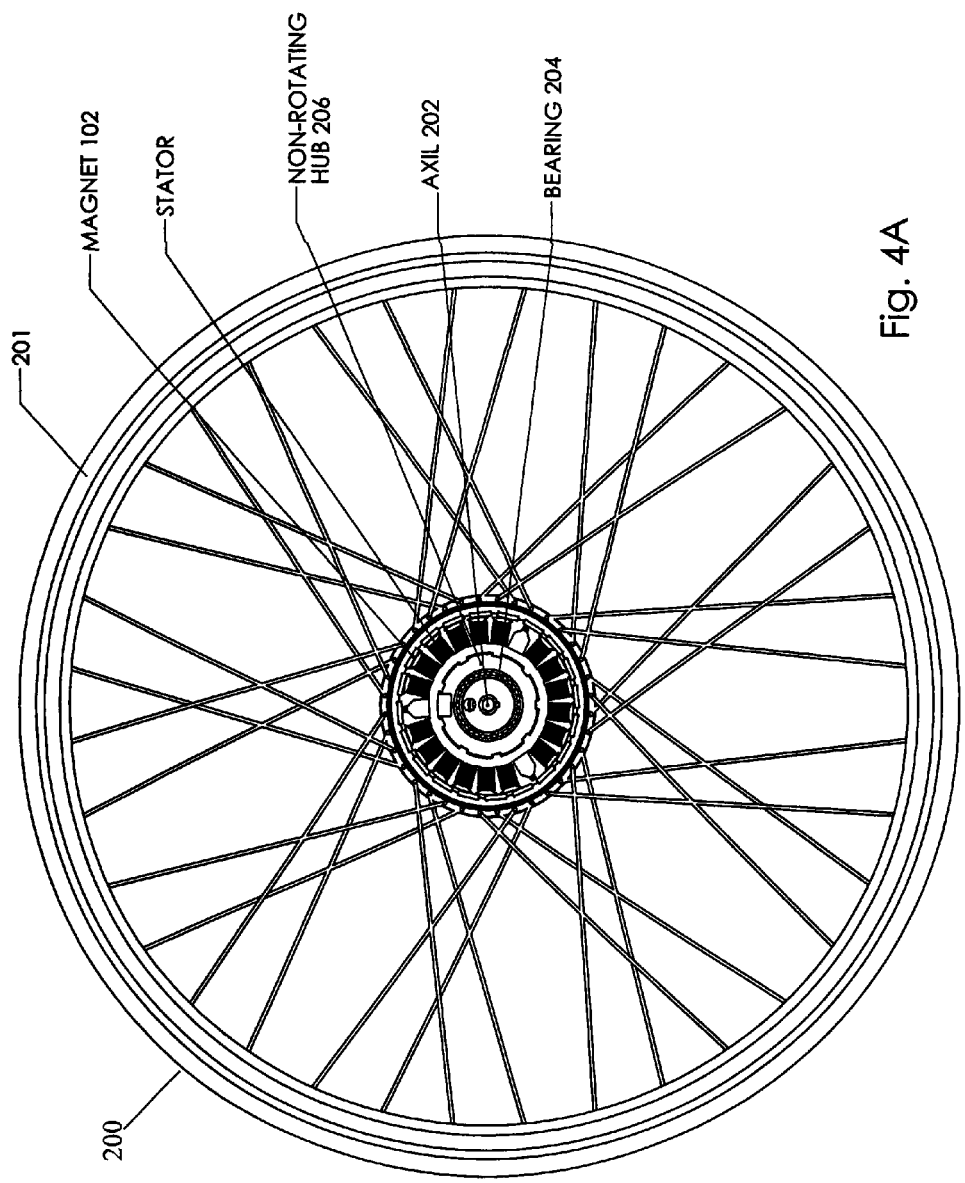
FIG. 4A shows a single stator machine installed as an electric bicycle motor with the inner stator stationary and the outer magnet drum rotating with the bicycle wheel.
Figure 4B:
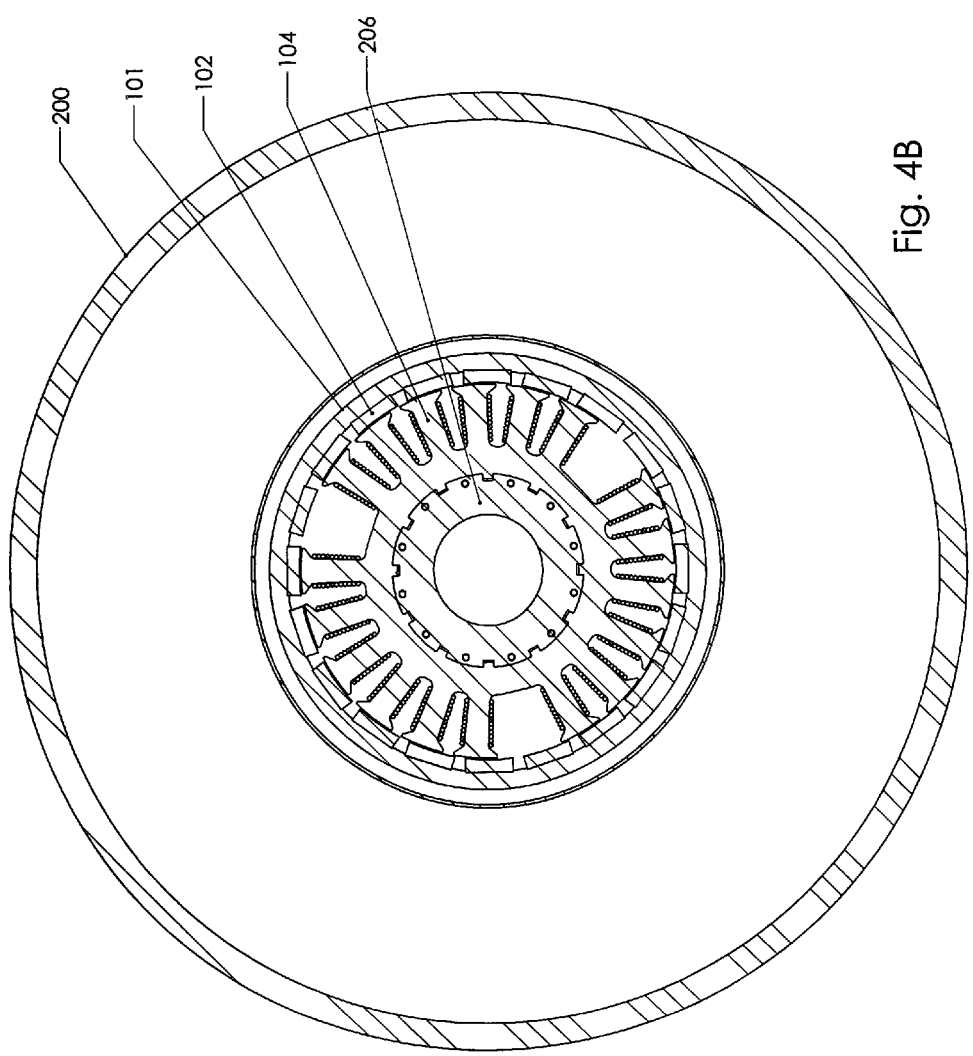
FIG. 4B shows the single stator machine installed as a wheel motor within a tire.
Figure 5:
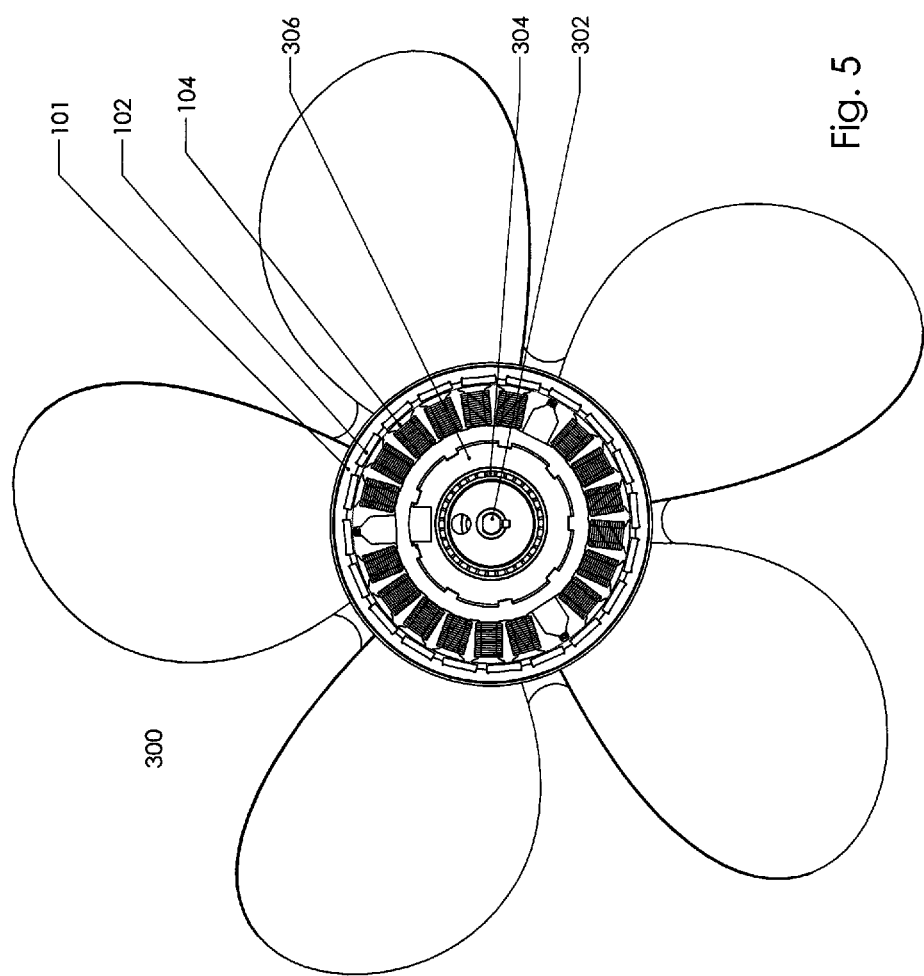
FIG. 5 shows a single or multi stator machine installed in the hub of a propeller with the stator or stators stationary and the outer magnet drum built into the hub of the propeller to rotate with it.

FIG. 4A shows an example as a single stator machine installed as an electric bicycle motor with the stator having an odd number of pole placements in which the unbalanced, orphan poles are removed which is contained within the hub of a rear or front wheel of a bicycle. The inner stator 104 that is coupled with the non-rotating hub 206 is stationary, and the outer magnet drum 101 rotates with the bicycle wheel 200. FIG. 4B shows the single stator machine installed as a wheel motor showing the rotating magnet housing 101 and magnets 102 with the non-rotating stator 104 connected with the non-rotating hub 206. FIG. 5 shows another use of the motor of the present invention with a single or multi stator machine installed in the hub 306 of a propeller 300, in which the stator or stators 104 are stationary and the outer magnet drum 101 is built into the hub 306 of the propeller 300 and rotates with it.

Figure 6:
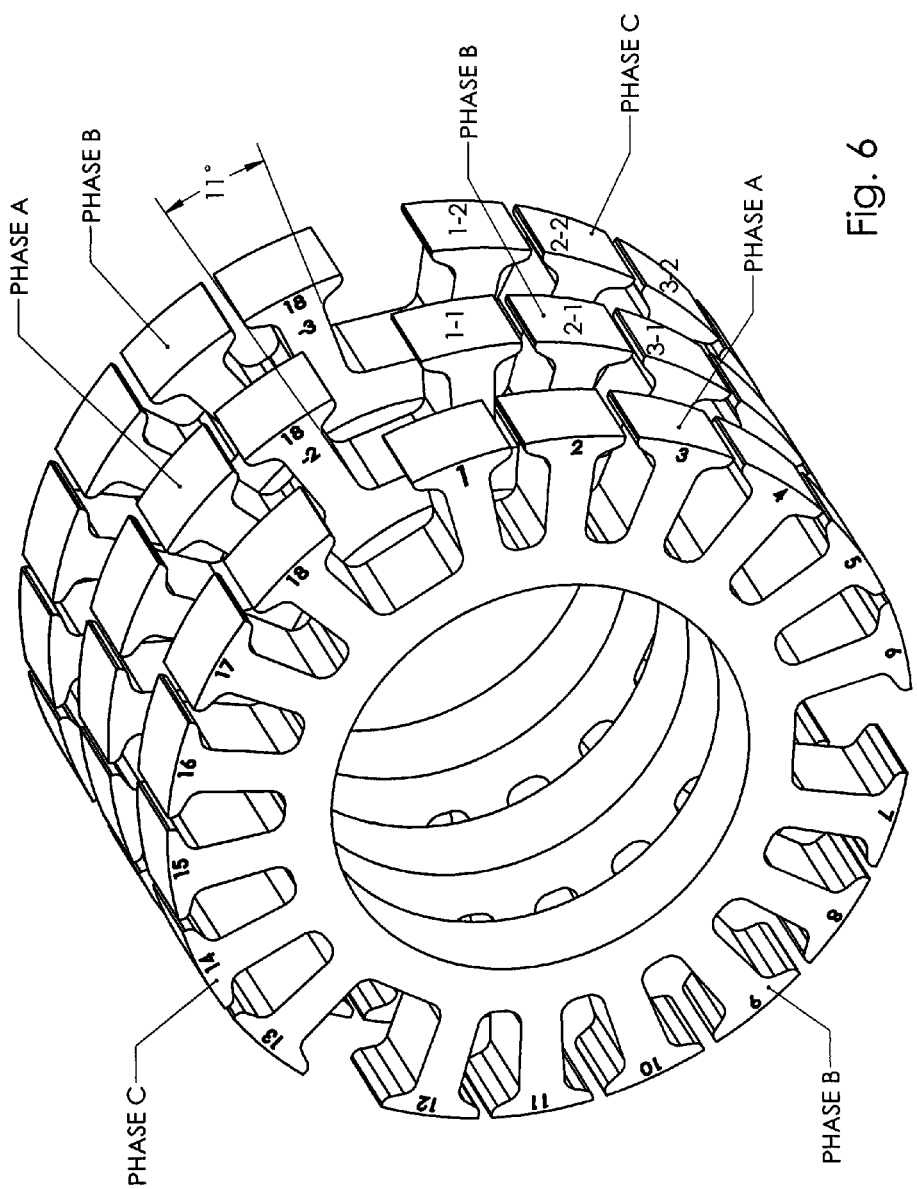
FIG. 6 is a perspective view of a three stator configuration showing the offset between three stators and showing phase groups which match phase.

FIG. 6 shows a perspective three-dimensional view of a three stator configuration showing the offset between stators, and showing certain phase groups which match phase. As shown, each of the three stators includes phase A, phase B, and phase C, each offset as shown in the linear depiction of the same stators FIG. 3B.

Figure 7A:
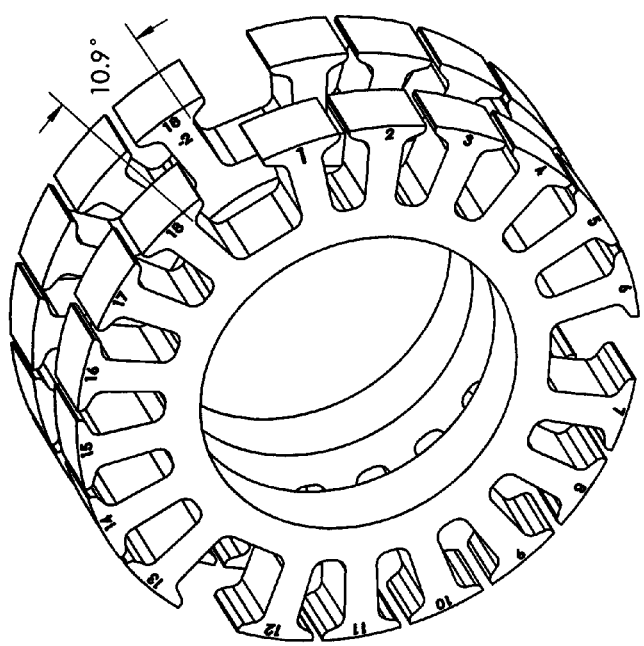
FIG. 7A is a three-dimensional perspective view of two three phase stators assemblies showing the offset angle between the two stators.
Figure 7B:
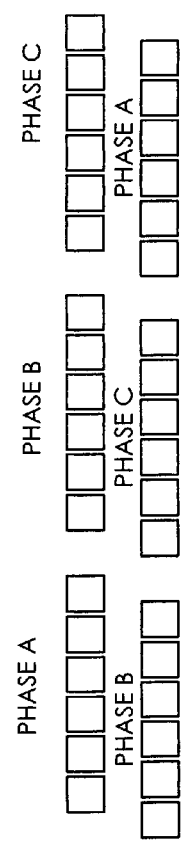
FIG. 7B shows a linear depiction of the two three phase stator poles.

A three-dimensional perspective view of a three phase stator consisting of two stator assemblies is shown in FIG. 7A and also shows the offset angle between the stators, plus a linear depiction of the stator poles, showing the corresponding pole group phase similarities where it can be desirable to operate them as separate but independent three phase machines. FIG. 7B shows a linear depiction of the same stators, where groups of poles that have the same phase (A, B or C) can be interconnected or can be operated separately.

Figure 8:
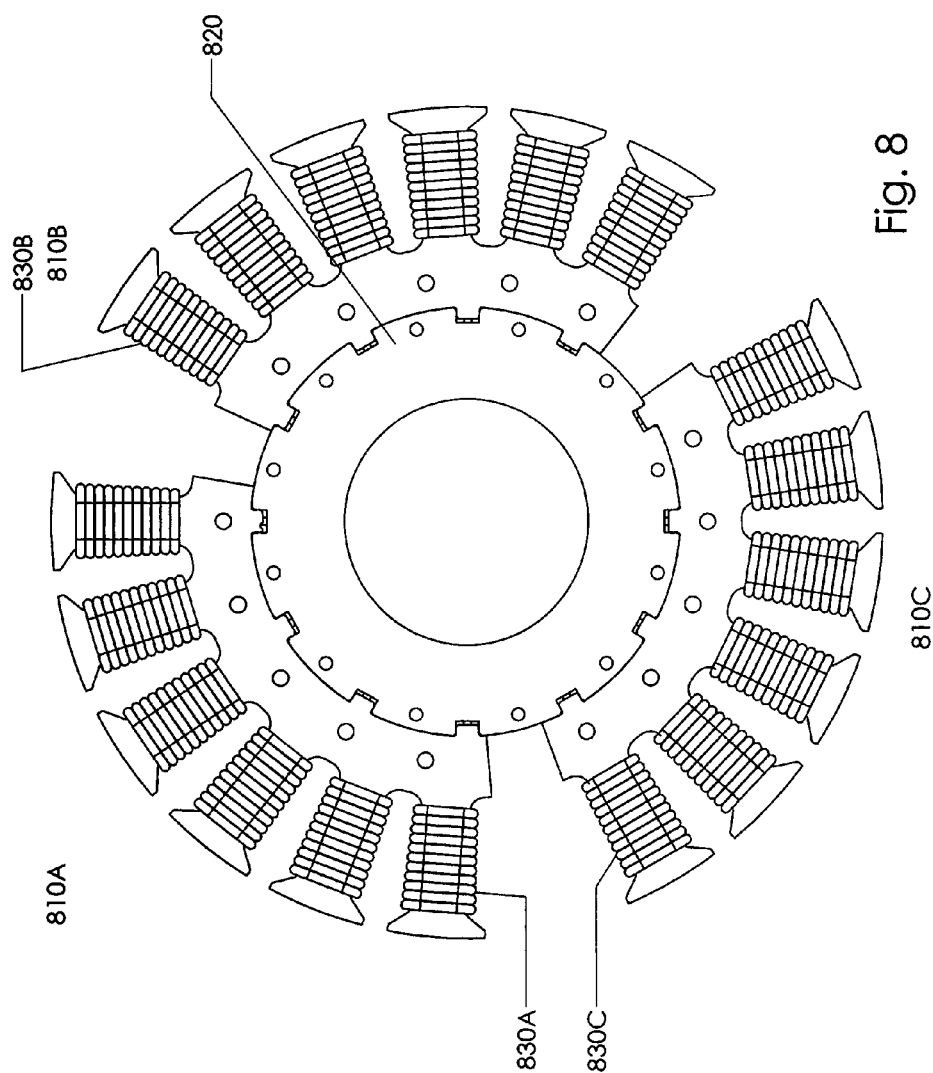
FIG. 8 shows a stator assembly with three pole group assemblies that are independently fabricated, with the space vacated by removal of the orphan poles deleted, and with each individual pole groups fastened to a non metallic hub assembly so that each phase pole group is magnetically isolated from the other group assemblies.

FIG. 8 shows a stator assembly with the three pole group assemblies 810A, 810B and 810C are independently fabricated. As shown, the space vacated by removal of the orphan poles is deleted. Each individual pole group 810A, 810B and 810C can be fastened to a non metallic hub assembly 820 so that each phase pole group is magnetically isolated from the other group assemblies, which results in higher operating efficiency. In the motor/generator embodiment shown, each of the individual stator poles of a multi phase machine can be wound with conductors 830A, 830B and 830C powered by only one phase, keeping each magnetic circuit separate and not inter mingled. This configuration results in greater efficiency and reduced magnetic saturation.

Figure 9:
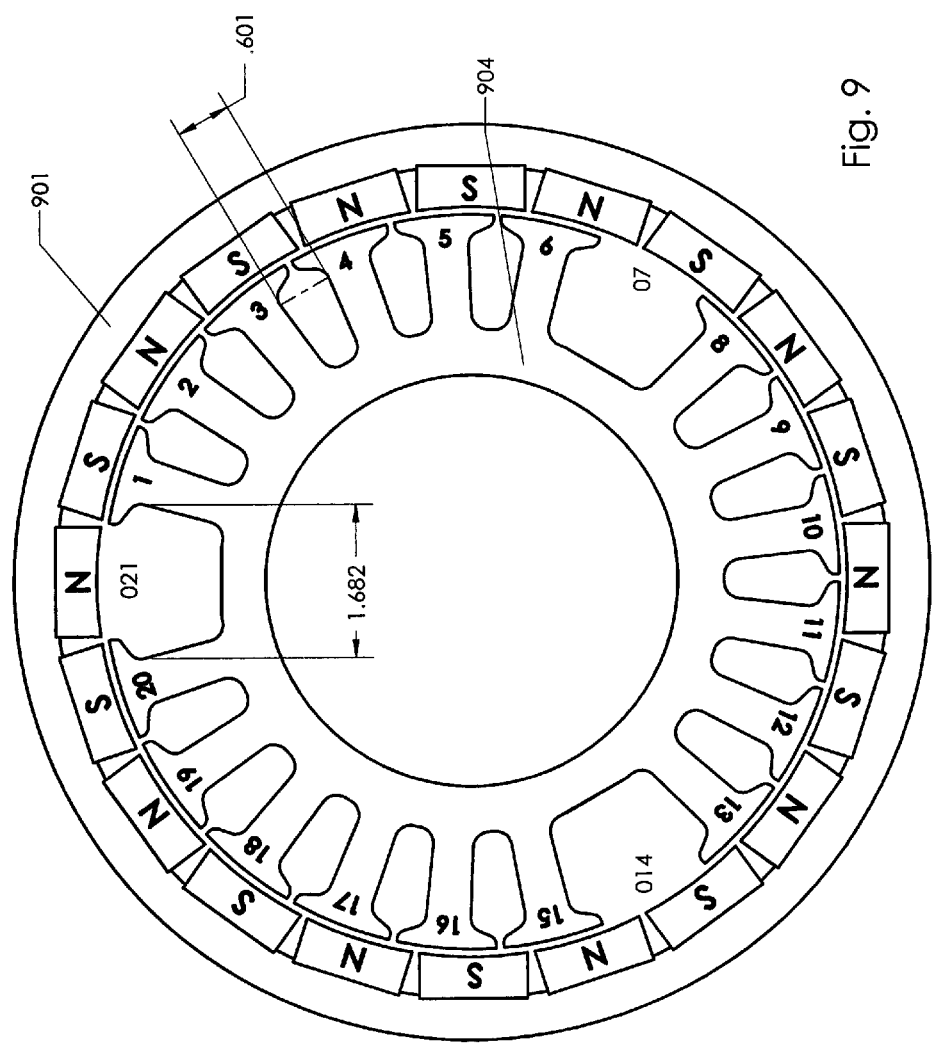
FIG. 9 shows a 21 pole evenly spaced stator, with three orphan poles removed, surrounded by a 20 pole Permanent Magnet Rotor Drum, showing the resulting geometric spacing between poles and the spacing of the removed orphan poles.

FIG. 9 shows a 21 pole evenly spaced stator 904, with three orphan poles 07, 14 and 21 removed, surrounded by a 20 pole permanent magnet rotor drum 901, showing the resulting geometric spacing between poles of approximately 0.601 and the spacing of the removed orphan poles as approximately 1.682.

Figure 10:
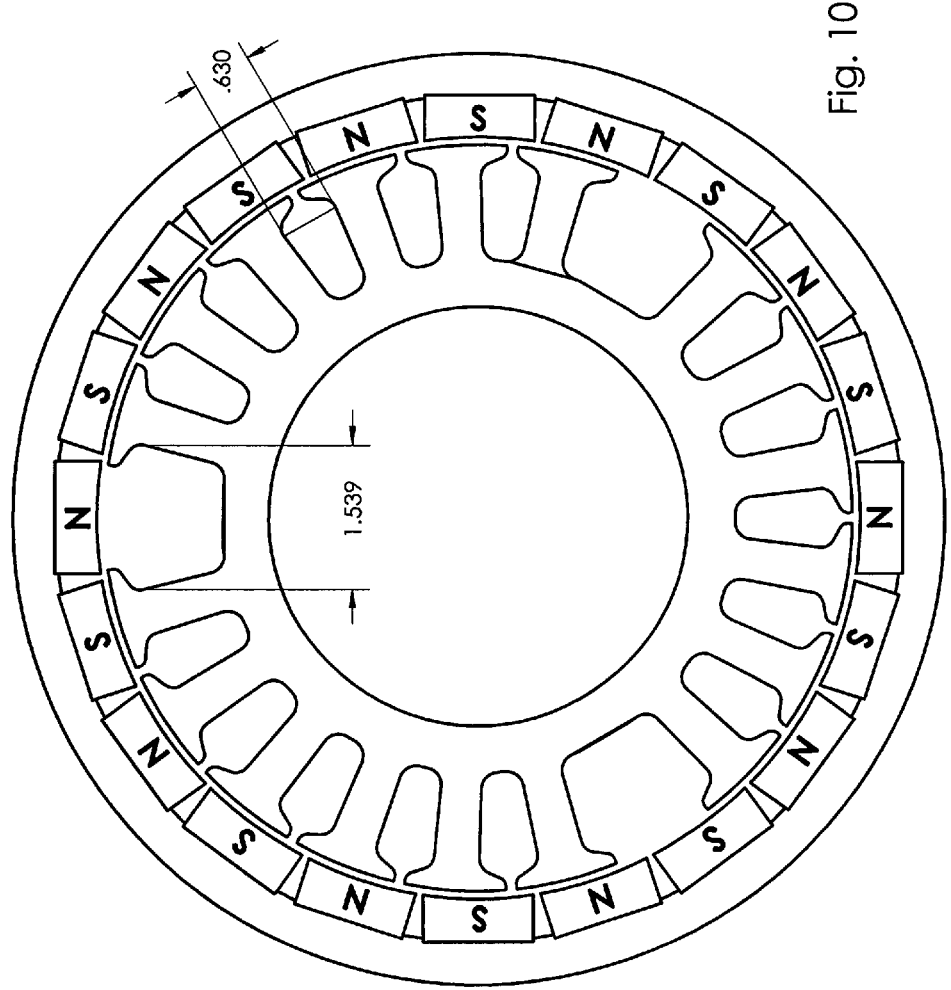
FIG. 10 shows the same configuration as FIG. 9, except the active pole spacing in each phase group is "stretched" approximately 3%, but less than the sum total of one pole width to improve efficiency and allow increased room for coil windings.

FIG. 10 shows the same configuration as FIG. 9, except the active pole spacing in each phase group is "stretched" approximately 3%, but less than the sum total of one pole width, to improve efficiency and allow increased room for coil windings. In this embodiment, the motor/generator utilizes one less permanent magnet in the rotor than the otherwise evenly spaces odd number of stator poles. The unbalanced poles are removed and the remaining active poles are spaced further apart (shown as approximately 0.630) than the dimension of the original odd number of stator pole positions (approximately 0.601), but less than that dimension of the next lower (even) number of permanent magnet pole positions, to gain increased efficiency. As a result of increasing the spacing between stator poles, the spacing between phase poles where the orphan poles are removed is decreased to approximately 1.539.

Those skilled in the art will understand that alternative spacing between poles and the spacing of the removed poles can be adjusted. For example, a motor/generator with one more magnetic pole in the stator original spacing, than in the rotor, and arranged so that the otherwise evenly spaced odd number of stator poles, in which the unbalanced poles are removed, and the remaining active poles are spread out from each other by an additional space up to 4% to allow the active poles more space for additional copper windings or larger copper windings as shown in FIG. 8.

Figure 11:
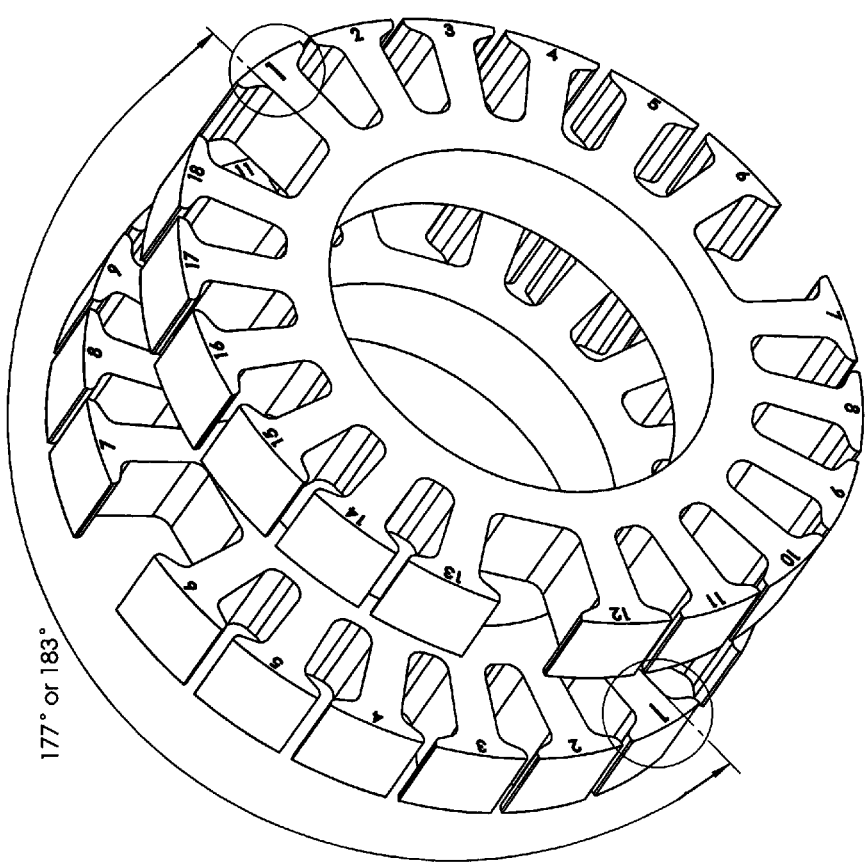
FIG. 11 is a perspective view showing a two internal stator machine each having a three phase configuration to mate with a permanent magnet 20 pole external rotor, and two identical stators, offset from each other by 180 mechanical degrees, plus or minus 30 electrical degrees, which for this configuration equals three mechanical degrees. Overall mechanical spacing is 177 or 183 degrees.

FIG. 11 shows a two stator assembly as two sets of three phase configuration for use with a 20 pole permanent magnet external rotor. The two identical stators are offset from each other by approximately 180 mechanical degrees, plus or minus 30 electrical degrees (which with this geometry is equivalent to three mechanical degrees shown as 177 degrees or 183 degrees). This configuration can null any vestiges of torque ripple.

Figure 12:
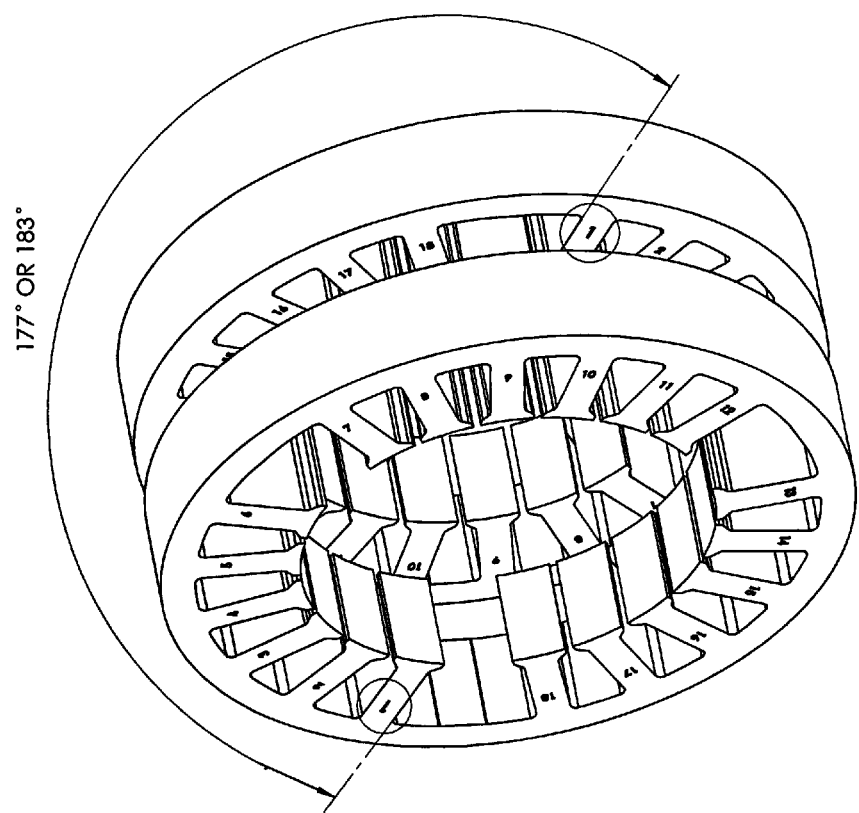
FIG. 12 is a perspective view showing a two external stator machine with each stator in three phase configuration with a permanent magnet 20 pole internal rotor, with the identical external stators offset by 180 mechanical degrees plus or minus 30 electrical degrees. (30 electrical degrees equals 3 mechanical degrees) for a total mechanical spacing of 177 or 183 degrees.

In the previous examples the motor/generators were internal stators with external permanent magnet rotors. FIG. 12 shows another two stator configuration with two sets of three phase poles, with a permanent magnet 20 pole internal rotor, with the identical external stators offset by 180 mechanical degrees plus or minus 30 electrical degrees which as previously stated, is approximately 3 mechanical degrees shown as 177 degrees or 183 degrees.

Figure 13:
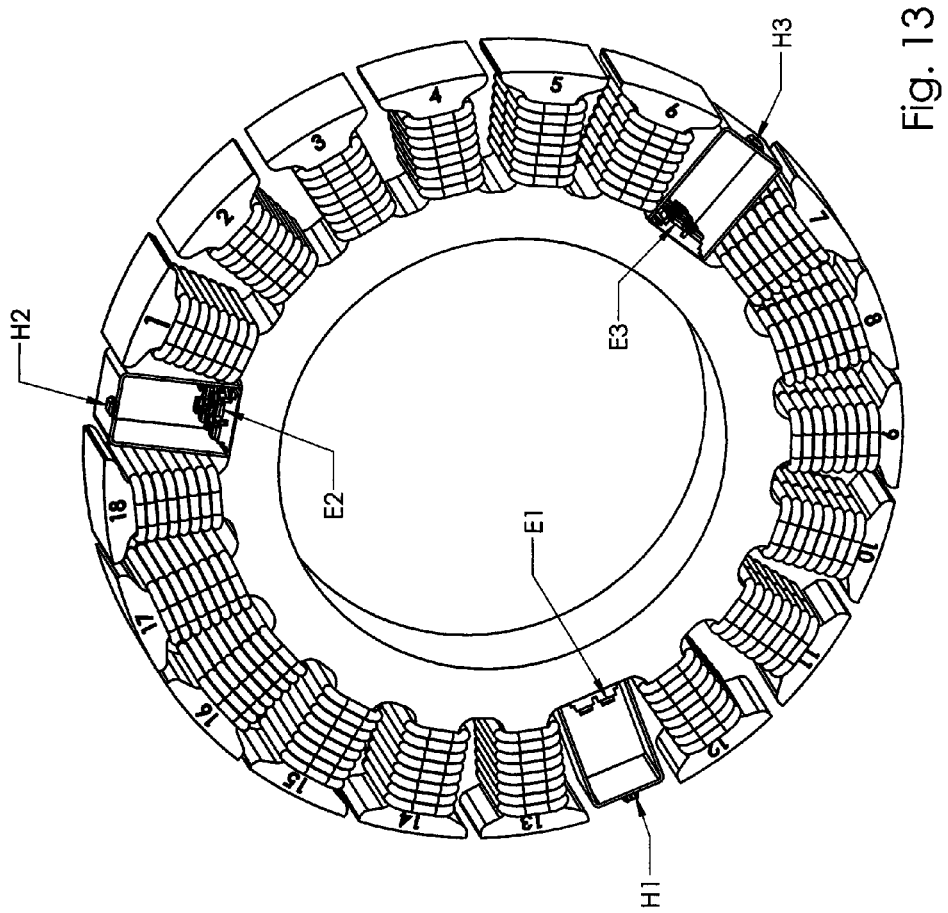
FIG. 13 shows a single stator portion of a three phase machine in which the switching electronics are physically mounted to the stator hub in the space vacated by removal of the orphan poles.

Another embodiment provides a motor/generator in which multiple Hall sensors to detect rotor position and speed are located in the position magnetically undisturbed by the electromagnets of the stator, in the location made available by the removal of the orphan or unbalanced stator poles. The variable timing signals are then available to the electronic drive for use to optimize performance and efficiency for different speeds and directions of rotation. FIG. 13 shows a single stator portion of a three phase machine in which the switching electronics (shown as E for electronics and H for Hall sensors) are physically mounted to the stator hub in the space vacated by removal of the orphan poles. This configuration uses the stator core for the semiconductor's heat sink.

Figure 14A:
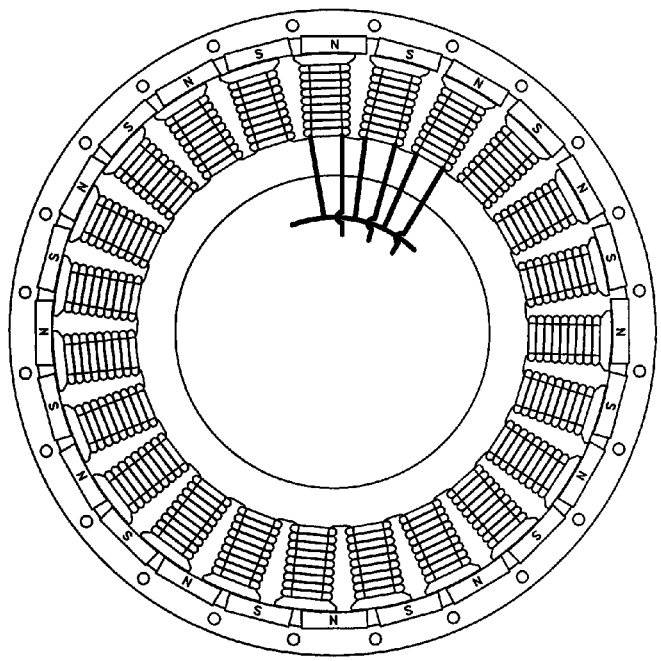
FIG. 14A shows an external permanent magnet rotor with an even number of poles, an internal stator with an odd number of evenly spaced poles with one terminal of each of the separate stator coils connected together to form an electrical neutral bus.
Figure 14B:
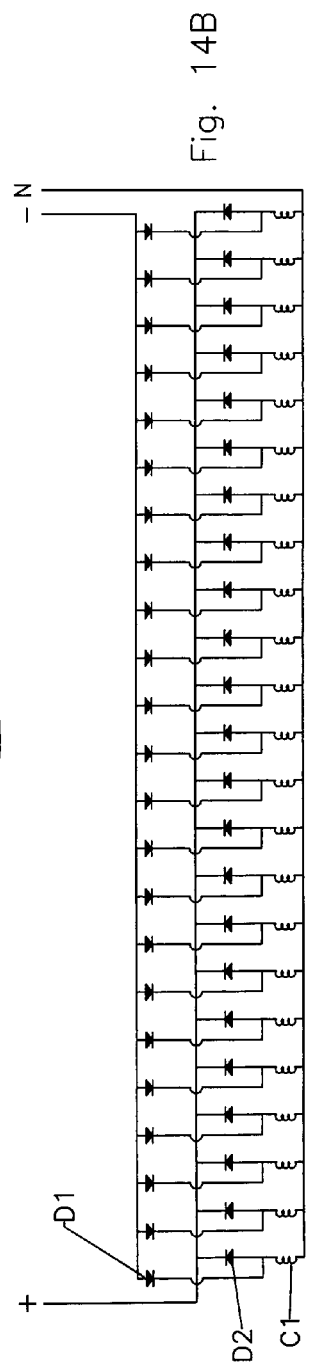
FIG. 14B is an electrical schematic showing the interconnections between motor coils (C1 . . . ), rectification diodes (D1 . . . ), and DC buss bars (+, −, N).

FIG. 14A shows an external permanent magnet rotor with an even number of poles, an internal stator with an odd number of evenly spaced poles. As shown, each stator pole is wound with a conductor to form stator coils with one terminal of each of the separate stator coils connected together to form an electrical neutral bus. Each of the other coils windings are separately rectified by two semiconductor switches, diodes or controlled semiconductor switches permitting synchronous rectification to generate nearly ripple free positive and negative DC without the need for filtering. A schematic representing the interconnections between motor coils (C1 . . . ), rectification diodes (D1 . . . ), and DC buss bars (+, −, N) is shown in FIG. 14B.

Similar to FIG. 14A, FIG. 15A shows an external permanent magnet rotor with an even number of poles and an internal stator with an odd number of evenly spaced poles with one terminal of each separate stator coil winding connected to a common neutral bus. The other terminal of each stator winding is independently connected to two semiconductor switches shown in FIG. 15B, enabling synchronous rectification when operating as a generator and enabling synchronous brushless commutation when operating as a motor, merely by supplying appropriate timing signals to the semiconductor switches' gate terminals. A schematic showing the connections between the stator coils (C1 . . . ), the semiconductor switches (T1 . . . ) and the three electrical busses (+, −, N) is shown in FIG. 15B.

FIG. 15C shows a schematic with connections between stator coils (C1 . . . ) the complimentary timed semiconductor switches (T1, T2 . . . ) and a three phase alternating current buss (Phase A, Phase B, and Phase C), which allow the machine, as a generator, to output variable voltage and variable frequency three phase alternating current. In reverse, when the three phases of buss are supplied with alternating current, the complimentary semiconductor switches can be properly timed to allow the machine to operate as a variable speed AC motor.

An advantage of the a motor/generator in which the vacated space from the removed orphan poles is to provide a cooling air channel and a wiring location for interconnected groups of active stator poles. In an embodiment of the present invention provides a motor/generator that has a rotating rotor that includes an even number of alternating polarity permanent magnet poles, and multiple stators with an odd number of evenly spaced alternating magnetic polarity electromagnetic poles with magnetically unbalanced, or orphan, pole positions removed without re-spacing the remaining stator poles, for an exterior rotor or interior rotor configuration.

The one or more stators can have multiple segments of stator poles on each stator which have their coil windings wired serially or in parallel with electrically offset stator positions to create a multiple phase machine, where the similarly phased stator pole groups in each stator are electrically interconnected. The multiple stators, each with multiple segments of stator poles, with each segment of stator poles powered by or generating one electrical phase, with the electrical phases contained within the stator pole groups of one stator, and are electrically independent of the remaining stators, so that each stator assembly is independently powered from a different source for complete redundancy.

The offset between identical stators can be any number of mechanical degrees, and the number of mechanical degrees can be determined in experimental testing to null out any remaining torque ripple.

Figure 16:
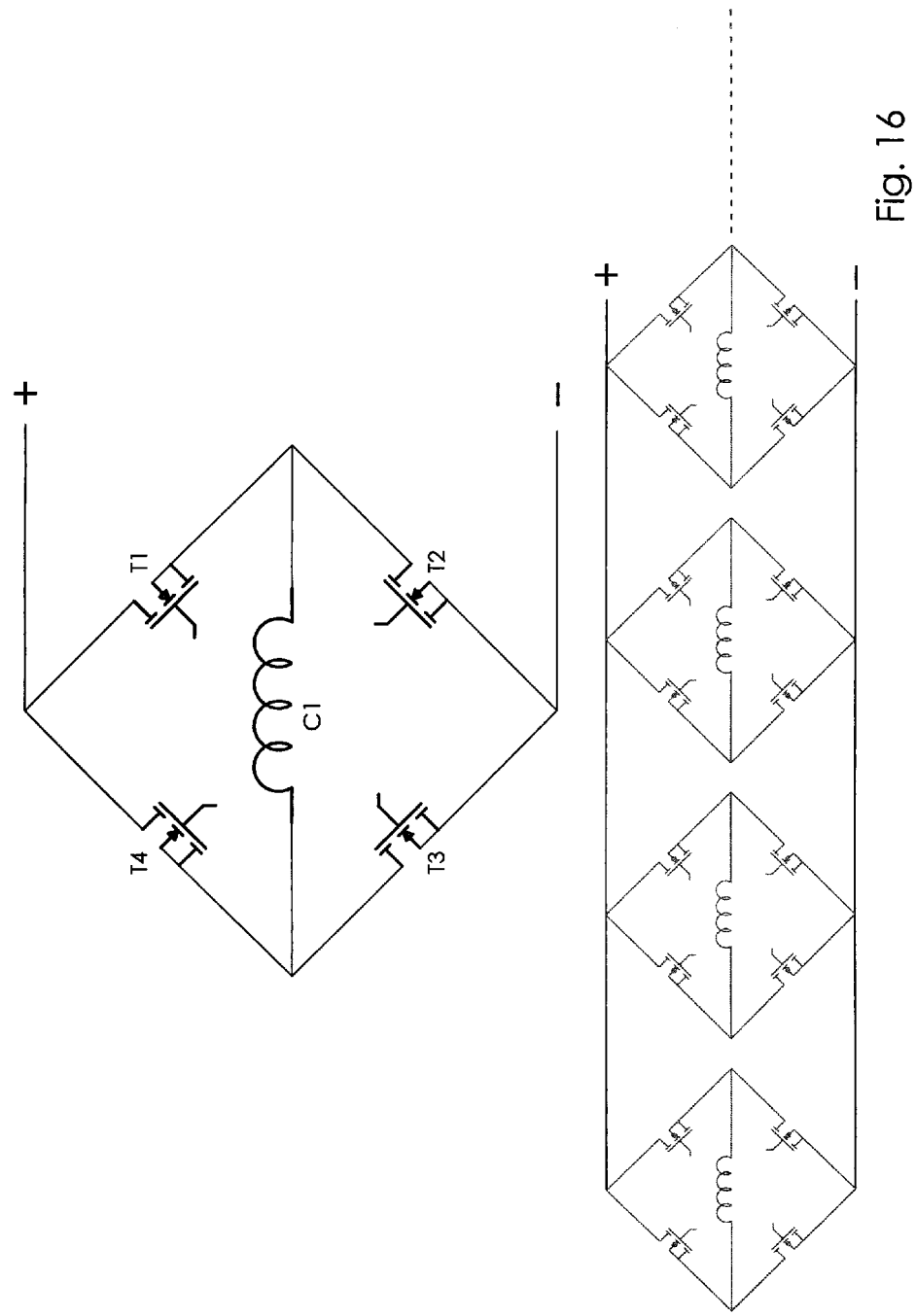
FIG. 16 shows the stator coils (C1 . . . ) connected with complimentary switching semiconductors (T1, T2 . . . ) in a bridge configuration to produce variable voltage Direct Current output for a two wire circuit when used as a generator, or as a variable speed motor being operated from a two wire DC source.

FIG. 16 shows the stator coils (C1 . . . ) connected with complimentary switching semiconductors (T1, T2 . . . ) in a bridge configuration to produce variable voltage Direct Current output for a two wire circuit when used as a generator, or as a variable speed motor being operated from a two wire DC source.

An embodiment provides a rotor-stator structure that includes a rotor having an even number of evenly spaced alternating polarity permanent magnet rotor poles; and one or more stators each having an odd number of evenly spaced stator electromagnetic poles. The can be an exterior drum rotor or can be an interior drum rotor. Each stator pole can be individually driven by a switching electronics for synchronous rectification of ripple free direct current or torque ripple free power output.

The rotor-stator structure wherein the rotor and stator includes an even number of permanent magnets in the rotor and an odd number of wound stator poles in the stator with one coil terminal per wound pole coil winding connected to a common electrical neutral, and the other coil terminal of each stator coil per wound pole coil winding is connected to two semiconductor switches capable of variable synchronous rectification when acting as a generator and variable synchronous brushless commutation when acting as a motor.

The rotor-stator structure wherein the rotor and stator includes an even number of permanent magnets in the rotor and an odd number of poles in the stator, in which the one coil terminal of each of the stator coil windings is connected to a common electrical neutral, and the other coil terminal of each stator coil winding is connected to two semiconductor diodes or electronic switches capable of variable synchronous rectification to generate nearly ripple free positive and negative Direct Current Output without the need for filtering, while presenting the driving engine with a negligible amount of torque ripple.

The rotor-stator structure as a generator including an even number of permanent magnet moving poles in the rotor, an odd number of wound stator poles, in which an AC output of each individually wound pole is rectified and the timing of the synchronous switch can be varied to gave a variable and ripple free Direct Current output.

The rotor-stator structure as a generator that includes an even number of permanent magnet poles, and an odd number of stator poles, in which each stator coil is individually wound and the AC output of each is rectified by a semiconductor switch of either a diode or a semiconductor switch, allowing synchronous rectification to a DC bus.

The rotor-stator structure can be a generator that includes a rotor with an even number of alternating polarity permanent magnet poles, a stator with an odd number of stator poles, in which each stator pole coil is individually wound and one terminal of each coil is connected with a common neutral, the other terminal of each coil is connected to complimentary properly timed semiconductor switches, which are grouped in three groups, the output of each group producing one phase of variable frequency and variable voltage three phase alternating current with neutral.

The rotor-stator structure can be a generator that includes a rotor with an even number of alternating polarity permanent magnet poles, a stator with an odd number of stator poles, in which each stator pole coil is individually wound and the two terminals of each coil are connected to complimentary properly timed semiconductor switches each in a bridge configuration, which are grouped in three groups, the output of each group producing one phase of variable frequency and variable voltage three phase alternating current.

The rotor-stator structure of can be powered as a variable speed alternating current motor that includes a rotor with an even number of alternating polarity permanent magnet poles, a stator with an odd number of poles, in which each stator pole coil is individually wound and one terminal of each coil is connected to a common neutral, and the other terminal of each coil is connected to a complimentary, timed semiconductor switch of three groups, each group being supplied with one phase of alternating current via an AC buss, to allow the machine to operate as a variable speed AC motor, providing seamless power, free of torque ripple.

The rotor-stator structure can be powered as a variable speed alternating current motor that includes a rotor with an even number al alternating polarity permanent magnet poles, a stator with an odd number of poles, in which each stator pole coil is individually wound with the coils terminals connected to complimentary, timed semiconductor switches in a bridge configuration, with the individual bridges arranged three groups, each group being supplied with one phase of alternating current via an AC buss, to allow the machine to operate as a variable speed AC motor, providing seamless power, free of torque ripple.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A rotating electrical machine comprising:
a rotating rotor having an even number of alternating polarity permanent magnet poles; and
a stationary stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups, a powering and controlling electronic circuit located in and mounted to the gap between each stator phase group, wherein the gap between adjacent stator phase groups is machined flat to allow the mounting of an electronics mounting plate and to allow the stator core surface to act as a heat sink for the electronics mounting plate.

2. The rotating electrical machine of claim 1, further comprising:
a formulae to calculate a stator pole number and rotor pole number for a three phase machine according to one of $(3Y+1)=X$ and $(3Y-1)=X$ where
$X$=number of permanent magnetic poles in the rotor,
$Y$=number of pole positions in each stator phase group,
$(Y-1)$=number of active adjacent electromagnetic poles per phase group, and
$Y$=an odd integer not equal to one for the three phase machine.

3. The rotating electrical machine of claim 1 wherein the stationary stator comprises:
one single stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups, the one single stator surrounding one single permanent magnet rotor having an even number of alternating polarity permanent magnets.

4. The rotating electrical machine of claim 1, wherein the stator comprises:
an odd number of stator phase groups each fabricated separately and mounted to a non-magnetic hub using non-magnetic materials to magnetically isolate each stator phase group from each other for greater efficiency.

5. The rotating electrical machine of claim 4, further comprising:
electrical windings around each one of the stator poles, the electrical windings having a common neutral terminal, each adjacent electrical winding alternately driven by a positive power source and a negative power source with the common neutral terminal of the positive and negative power sources connected to the stator pole electrical windings common neutral.

6. The rotating electrical machine of claim 4, wherein the stator includes one more magnetic stator pole spaces than in the number of rotor permanent magnet poles, and arranged so that the otherwise evenly spaced odd number of stator poles, in which the unbalanced poles are removed, and the remaining active poles are spread out from each other by an additional space up to 4% to allow the active poles more space for additional copper windings and larger copper windings.

7. The rotating electrical machine of claim 1 further comprising:
a powering and controlling electronic circuit located in and mounted in the gap between each stator phase group.

8. The rotating electrical machine of claim 1, wherein the powering and controlling electronic circuit comprises:
for each stator phase group, a Hall sensor to produce a timing signal located in the gap between each stator phase group away from the magnetic interference from the neighboring electromagnetic stator poles.

9. The rotating electrical machine of claim 1, wherein the machine is a generator and the powering and controlling electronic circuit comprises:
a rectification electronic circuit located within the gap between adjacent stator phase groups.

10. The rotating electrical machine of claim 1, wherein the machine is a multi phase machine and the powering and controlling electronic circuit comprises:
a conductor separately wound around each one of the stator poles of the multi phase machine as separate magnetic circuits that are not inter mingled for greater efficiency and reduced magnetic saturation.

11. The rotating electrical machine of claim 1, wherein the powering and controlling electronic circuit comprises:
multiple Hall sensors to detect rotor position and speed, the Hall sensors located in and mounted to the gap between stator phase groups to generate variable timing signals that are available to an electronic drive circuit to optimize performance and efficiency for different speeds and directions of rotation.

12. The rotating electrical machine of claim 1, further comprising:
a commutation electronic circuit located within the gap between adjacent stator phase groups.

13. The rotating electrical machine of claim 1 wherein the machine is connected to a hub of a vehicle wheel.

14. The rotating electrical machine of claim 1, wherein the rotor includes one less permanent magnet than the odd number of stator pole positions, and the active stator poles in each stator phase group are evenly spaced further apart than the dimension of the original odd number of stator pole positions, but less than that dimension of the next lower number of permanent magnet pole positions, to gain increased efficiency.

15. The rotating electrical machine of claim 1 wherein the gap between adjacent stator pole phases provides a cooling air channel and a wiring location for interconnected groups of active stator poles.

16. The rotating electrical machine of claim 1, wherein the stator includes an even number of stator poles in each stator phase group, each one of the stator phase groups wired to receive or generate power for one single phase in a multi-phase machine.

17. The rotating electrical machine of claim 1 further comprising:
multiple Hall sensors located in the gap between adjacent stator phase groups to sense position and speed of the rotor permanent magnets.

18. A rotating electrical machine comprising:
a rotating rotor having an even number of alternating polarity permanent magnet poles;
a stationary stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups; and
a formulae to calculate a stator pole number and rotor pole number for a five phase machine according to one of $(5Y+1)=X$ and $(5Y-1)=X$ where
X=number of permanent magnetic poles in the rotor,
Y=number of pole positions in each stator phase group,
Y=an odd integer not equal to one for the five phase machine, and
$(Y-1)$=number of active adjacent electromagnetic poles in each stator phase group.

19. The rotating electrical machine of claim 18 wherein the stationary stator comprises:
one single stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups, the one single stator surrounding one single permanent magnet rotor having an even number of alternating polarity permanent magnets.

20. The rotating electrical machine of claim 18 further comprising:
a powering and controlling electronic circuit located in and mounted in the gap between each stator phase group.

21. The rotating electrical machine of claim 20, wherein the powering and controlling electronic circuit comprises:
for each stator phase group, a Hall sensor to produce a timing signal located in the gap between each stator phase group away from the magnetic interference from the neighboring electromagnetic stator poles.

22. The rotating electrical machine of claim 20, wherein the gap between adjacent stator phase groups is machined flat to allow the mounting of an electronics mounting plate and to allow the stator core surface to act as a heat sink for the electronics mounting plate.

23. The rotating electrical machine of claim 20, wherein the machine is a multi phase machine and the powering and controlling electronic circuit comprises:
a conductor separately wound around each one of the stator poles of the multi phase machine as separate magnetic circuits that are not inter mingled for greater efficiency and reduced magnetic saturation.

24. The rotating electrical machine of claim 20, wherein the powering and controlling electronic circuit comprises:
multiple Hall sensors to detect rotor position and speed, the Hall sensors located in and mounted to the gap between stator phase groups to generate variable timing signals that are available to an electronic drive circuit to optimize performance and efficiency for different speeds and directions of rotation.

25. The rotating electrical machine of claim 18, further comprising:
a commutation electronic circuit located within the gap between adjacent stator phase groups.

26. The rotating electrical machine of claim 18, wherein the machine is a generator and the powering and controlling electronic circuit comprises:
a rectification electronic circuit located within the gap between adjacent stator phase groups.

27. The rotating electrical machine of claim 18, wherein the rotor includes one less permanent magnet than the odd number of stator pole positions, and the active stator poles in each stator phase group are evenly spaced further apart than the dimension of the original odd number of stator pole positions, but less than that dimension of the next lower number of permanent magnet pole positions, to gain increased efficiency.

28. The rotating electrical machine of claim 18 wherein the gap between adjacent stator pole phases provides a cooling air channel and a wiring location for interconnected groups of active stator poles.

29. The rotating electrical machine of claim 18, wherein the stator includes an even number of stator poles in each stator phase group, each one of the stator phase groups wired to receive or generate power for one single phase in a multi-phase machine.

30. The rotating electrical machine of claim 18 further comprising:
multiple Hall sensors located in the gap between adjacent stator phase groups to sense position and speed of the rotor permanent magnets.

31. A generator comprising:
a rotating rotor having an even number of alternating polarity permanent magnet poles;
a stationary stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups; and
a powering and controlling electronic circuit including a rectification electronic circuit located within the gap between adjacent stator phase groups.

32. A generator comprising:
a rotating rotor having an even number of alternating polarity permanent magnet poles; and
a stationary stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups, a powering and controlling electronic circuit located in and mounted to the gap between each stator phase group, wherein the gap between adjacent stator phase groups is machined flat to allow the mounting of an electronics mounting plate and to allow the stator core surface to act as a heat sink for the electronics mounting plate.

33. A multi phase machine comprising:
a rotating rotor having an even number of alternating polarity permanent magnet poles;
a stationary stator divided into an odd number of evenly spaced pole positions, the odd number of pole positions divided into an odd number of equal stator phase groups each with an even number of adjacent alternating magnetic polarity electromagnetic active poles occupying an even number of phase group pole positions leaving a gap between each of the stator phase groups;
a powering and controlling electronic circuit located in and mounted to the gap between each stator phase group, the powering and controlling electronic circuit including a conductor separately wound around each one of the stator poles of the multi phase machine as separate magnetic circuits that are not inter mingled for greater efficiency and reduced magnetic saturation.

* * * * *